(12) United States Patent
Ganton et al.

(10) Patent No.: US 7,221,063 B2
(45) Date of Patent: May 22, 2007

(54) SYSTEM AND METHOD FOR PROTECTING MULTIPLEXED ELEMENTS SHARING A SINGLE ELECTRICAL LINE

(75) Inventors: Robert B. Ganton, San Diego, CA (US); Derick Hugunin, San Diego, CA (US)

(73) Assignee: Kyocera Wireless Corp., San Diego, CA (US)

(*) Notice: Subject to any disclaimer, the term of this patent is extended or adjusted under 35 U.S.C. 154(b) by 693 days.

(21) Appl. No.: 10/656,025

(22) Filed: Sep. 5, 2003

(65) Prior Publication Data

US 2005/0052812 A1 Mar. 10, 2005

(51) Int. Cl.
*B60L 1/00* (2006.01)
(52) U.S. Cl. .................................... 307/10.1
(58) Field of Classification Search ............ 307/10.1
See application file for complete search history.

(56) References Cited

U.S. PATENT DOCUMENTS 5,719,551 A * 2/1998 Flick .................. 340/426.25

* cited by examiner

*Primary Examiner*—Stephen W. Jackson

(57) ABSTRACT

A system and method are presented for protecting multiplexed elements sharing a single electrical line. The system includes a plurality of elements connected to the electrical line, a switch connecting, to the electrical line, a first element in the plurality of elements, and a detection sub-system. The detection sub-system evaluates a signal on the electrical line. A detection sub-system control output supplies control signals in response to comparing a signal voltage level to a compatibility threshold value. The switch operates in response to accepting the control signals. The compatibility threshold value can be selected to equal the maximum voltage compatible with the first element. In some cases, the switch is a transistor.

18 Claims, 3 Drawing Sheets

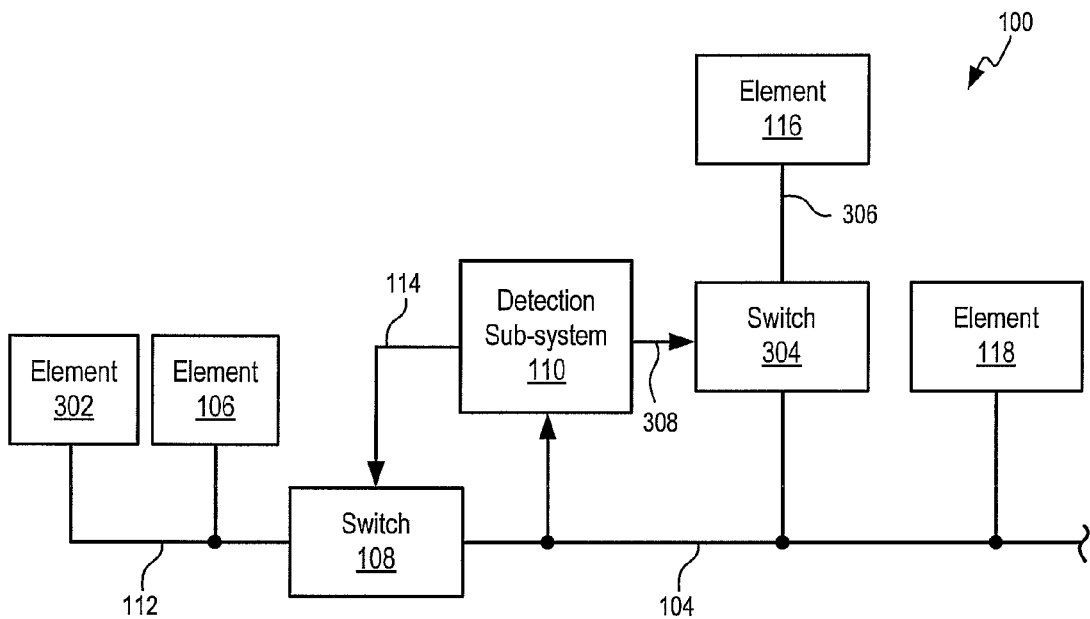
Fig. 3
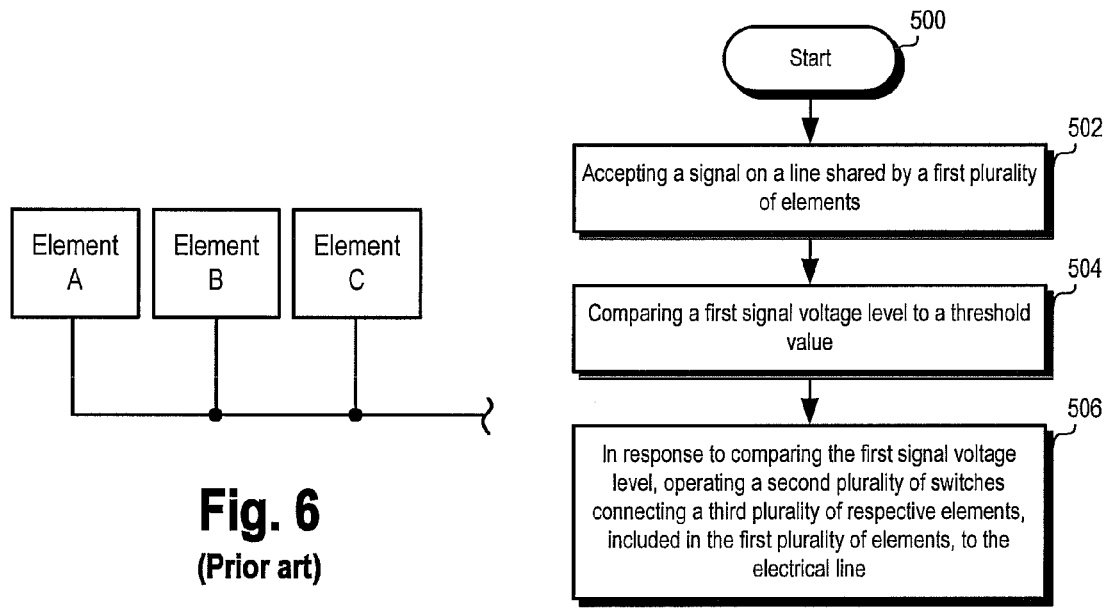
Fig. 6
(Prior art)
Fig. 5

12
SYSTEM AND METHOD FOR PROTECTING MULTIPLEXED ELEMENTS SHARING A SINGLE ELECTRICAL LINE

BACKGROUND OF THE INVENTION

1. Field of the Invention

This invention generally relates to portable electronic devices and, more particularly, to a system and method for protecting multiplexed elements sharing a single electrical line.

2. Description of the Related Art

FIG. 6 is a schematic block diagram depicting a plurality of elements multiplexed on a single line in a wireless communications device (prior art). A wireless telephone device is used as an example in the following discussion, however, it should be understood that the discussion applies to other electrical devices multiplexing elements on a single line. Wireless device users demand smaller devices with added capabilities, creating in turn, a need to reduce the number of components in the device. As shown in FIG. 6, it is known to multiplex multiple elements on a single line to reduce the number of components in a device. For example, if elements that interface with devices external to the wireless device, for example, a headset, share a single line and a single interface port, the component count for the device can be reduced by eliminating the need to use separate interface ports for individual elements or sub-groupings of elements.

Unfortunately, there are limitations associated with the multiplexing scheme noted above. Among the limitations is the compatibility, particularly the voltage compatibility, of elements sharing a single line. Elements in a wireless device have different operating voltages and different thresholds of destruction (typically a function of element geometry). Physically linking elements with sufficiently different thresholds of destruction can result in damage to elements with lower thresholds. Therefore, the configuration shown in FIG. 6 is restricted to certain combinations of elements. For example, in FIG. 6, assume element A is an audio amplifier and element B supplies or accepts a DC signal of between 4.5 and 5.5V. If these two elements are multiplexed on the same line, element A can be back driven with a DC voltage from element B exceeding its threshold of destruction. Thus, elements A and B cannot be multiplexed on the same line and separate electrical interface ports are required to accommodate elements A and B. Unfortunately, failing to limit the number of parts, such as electrical interface ports, in a device can limit the size to which the wireless device can be reduced and can limit space available for other components. Increasing the parts count for a wireless device also adds to the cost of producing the wireless device.

It would be advantageous if elements with incompatible thresholds of destruction could be multiplexed on the same electrical line.

It would be advantageous if elements multiplexed on a single electrical line could be protected from voltage incompatibilities.

SUMMARY OF THE INVENTION

The present invention addresses multiplexing of elements on a single electrical line. The invention recognizes that multiplexing of multiple elements on a single electrical line can be limited by the compatibility of the elements. The invention addresses this problem by controllably interfacing elements multiplexed on a single line, responsive to voltage levels on the line.

Accordingly, a system is provided for protecting multiplexed elements sharing a single electrical line. The system includes a plurality of elements connected to the electrical line, a switch connecting, to the electrical line, a first element in the plurality of elements, and a detection sub-system. The detection sub-system evaluates a signal on the electrical line. A detection sub-system control output supplies control signals in response to comparing a signal voltage level to a compatibility threshold value. The switch operates in response to accepting control signals. The compatibility threshold value can be selected to equal the maximum voltage compatible with the first element. In some cases, the switch is a transistor.

Additional details of the above-described system and a method for protecting multiplexed elements sharing a single electrical line are provided below.

BRIEF DESCRIPTION OF THE DRAWINGS

FIG. 3 is a schematic block diagram depicting the use of the system shown in FIG. 1 to protect multiple elements multiplexed to a single electrical line.

FIG. 5 is a flow chart illustrating a method for protecting multiplexed elements sharing a single electrical line.

FIG. 6 is a schematic block diagram depicting a plurality of elements multiplexed on a single line in a wireless communications device (prior art).

DETAILED DESCRIPTION OF THE PREFERRED EMBODIMENTS

Figure 1:
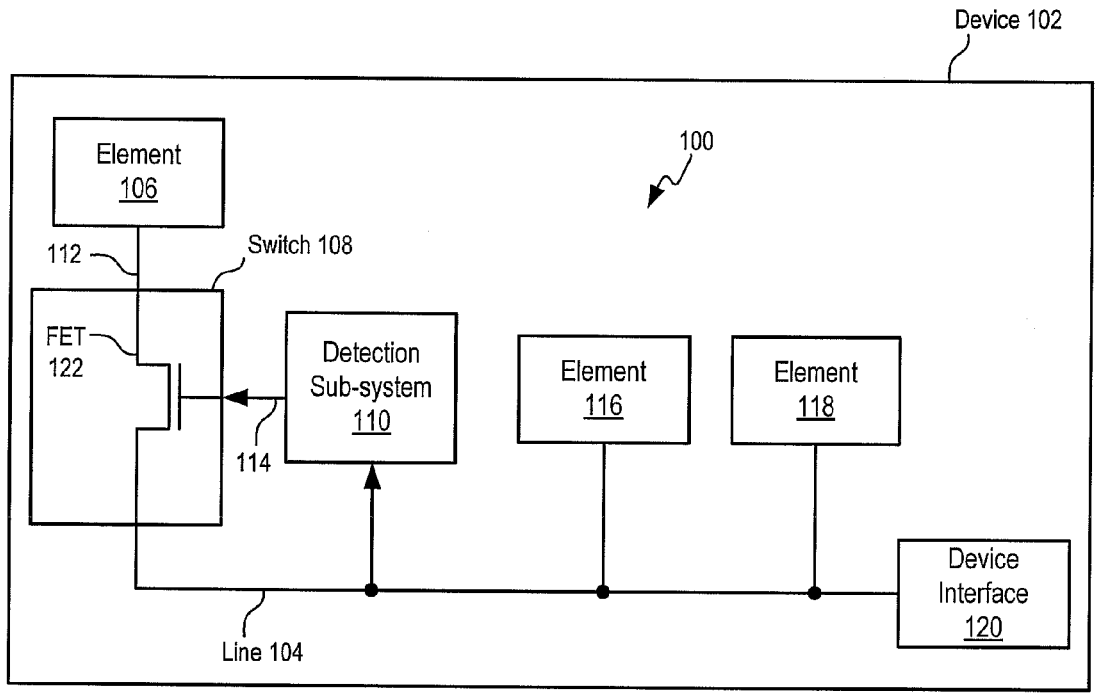
FIG. 1 is a schematic block diagram depicting a system for protecting multiplexed elements sharing a single electrical line.

FIG. 1 is a schematic block diagram depicting a system 100 for protecting multiplexed elements sharing a single electrical line. The system 100 in a wireless device 102 includes an electrical line 104, an element 106, a switch 108, and a detection circuit 110. The element 106 has a port connected on line 112 to a first port in switch 108. The switch 108 has a second port connected to line 104 and a control input on line 114 to accept a first control signal. The switch 108 operates in response to accepting the control signal. The detection sub-system 110 has an input connected to the electrical line 104. The detection sub-system 110 uses the input to detect signals on the line 104 and evaluates detected signals. In response to the sub-system 104 evaluating detected signals, a first control output on line 114 supplies the first control signal. The system 100 also includes elements 116 and 118, each with a port connected to line 104. It should be understood that the system 100 is not limited to wireless devices and is applicable to any electrical device multiplexing multiple elements on a single electrical line. Elements 106, 114, and 116 are chosen for purposes of illustration and it should be understood that the system 100 is not limited to any particular number of multiplexed elements on line 104.

In general, elements 116 and 118 operate at voltage levels incompatible with element 106. Therefore, the detection sub-system 110 compares a voltage level for a detected signal with a compatibility threshold chosen to protect element 106, and supplies the first control signal in response to this comparison. In general, the operating voltages for elements 116 and 118 are undesirably high with respect to element 106. For example, the operating voltages could be higher than the threshold of destruction for element 106. That is, conducting the operating voltage for either of elements 116 or 118 along line 112 could damage element 106. Therefore, the compatibility threshold value is typically set equal to, or less than, a maximum voltage level compatible with element 106. The exact value used for the compatibility threshold depends on the parameters for the elements multiplexed on line 104 and the desired function of the system 100. It should be understood that the system 100 is not limited to any particular combination of element voltage compatibilities.

In some aspects, the switch 108 closes in response to the first control signal, however, it should be understood that the system 100 can be configured so that the switch 108 opens in response to the first control signal. Thus, in some aspects, in response to detecting a signal voltage level less than the compatibility threshold value, the detection sub-system 110 first control output supplies a first connection control signal on line 114. Then, the switch 108 closes in response to accepting the first connection control signal. Otherwise, the switch 108 remains open, protecting the element 106 from potentially harmful voltages on line 114.

In some aspects, the system 100 includes a device interface 120 with a port connected to the electrical line 104. The interface 120 is used to connect external devices (not shown) to the device 102. For example, the interface 120 could be an audio interface used to connect a headset.

In some aspects, the switch 108 is a transistor with a first terminal connected to the element 106 first port on line 112, a second terminal connected to the electrical line 104, and a third terminal connected to the detection sub-system 110 first control output on line 114. In some aspects, the transistor is selected from the group including field effect transistors (FETs) and bipolar junction transistors (BJTs). For the first and second transistor terminals, the source and drain terminals for a FET are used and the collector and emitter terminals for a BJT are used. An FET 122 is shown in FIG. 1. In some aspects, the detection sub-system 110 is a controller with an input connected to the electrical line 104 and a first output connected to the switch 108 control input on line 114.

Figure 2:
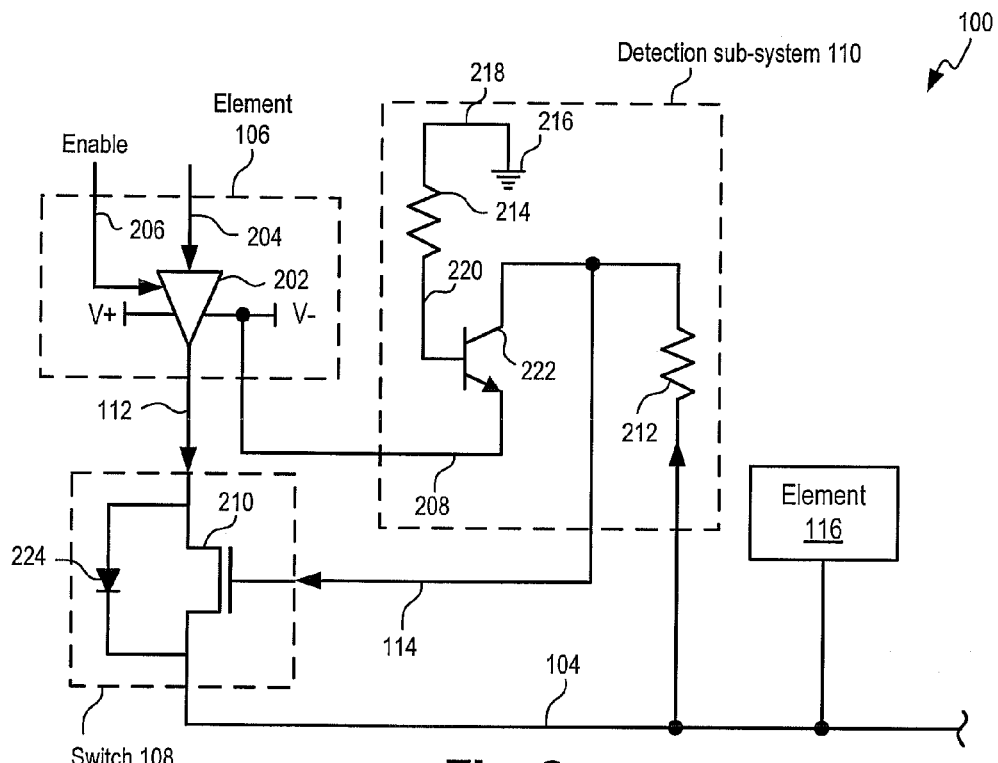
FIG. 2 is a schematic block diagram depicting in further detail, the system shown in FIG. 1.

FIG. 2 is a schematic block diagram depicting in further detail, the system 100 shown in FIG. 1. In some aspects, the element 106 is an amplifier 202 with an input on line 204 to accept an audio signal, a control input to accept an enable signal on line 206, and a control output on line 208 to supply a V-signal in response to accepting an enable signal on line 206. The amplifier 202 has an output to supply an amplified audio signal on line 112. In these aspects, the switch 108 is an FET 210 with a drain terminal connected to the amplifier output on line 112, a source terminal connected to the electrical line 104, and a gate terminal. In these aspects, the detection sub-system 110 includes: a resistor 212 with a first port connected to the electrical line 104 and a second port connected to the FET 210 gate terminal on line 114; a resistor 214 with a first port connected to ground 216 on line 218 and a second port on line 220; and a BJT 222 with a collector terminal connected to the FET 210 gate terminal on line 114, an emitter terminal connected to the amplifier 202 control output on line 208, and a base terminal connected to the resistor 214 second port on line 220. In this configuration, activating the FET 210 connects element 106 to line 104. The orientation of the diode 224 in the FET 210 is selected such that the diode 224 blocks a positive voltage on line 104. For a DC voltage on line 104, indicating that another element, for example, element 116, is supplying a signal on the line 104, the FET 210 is deactivated. The FET 210 is activated when there is no DC voltage on line 104 and the amplifier 202 supplies a V- signal on line 208.

Returning to FIG. 1, in some aspects, the elements 116 and 118 operate in a first range of voltages and the element 106 has a maximum voltage with which it is compatible. In some aspects, the maximum voltage is less than the first range, and therefore, whenever elements 116 and 118 are operating, the switch 108 remains open, isolating the element 106. In some aspects, the maximum voltage is included in the first range. Then, when the element 116 or 118 is operating and the respective operating voltage is above the maximum voltage, the switch 108 remains open, isolating element 106 from the line 104. When the element 116 or 118 is operating and the respective operating voltage is below the maximum voltage, the switch 108 closes, connecting element 106 to the line 104.

FIG. 3 is a schematic block diagram depicting the use of the system 100 shown in FIG. 1 to protect multiple elements multiplexed to a single electrical line. The system 100 is not limited to protecting only one element from the line 104 as shown in FIG. 1. For example, as shown in FIG. 3, the switch 108 can be repositioned to protect not only element 106, but an additional element 302 with a port connected to line 112. Typically, the elements 106 and 302 have relatively close respective thresholds of destruction. By using one switch to protect multiple elements multiplexed on a single line, rather than an individual switch for each of the multiple elements, the number of switches in a device can be reduced. Reducing the number of switches in a device reduces the size and cost of the device. It should be understood that the system 100 is not limited to protecting, with a single switch, any particular number of elements.

It also should be understood that the system 100 is not limited to just one switch. For example, switch 304 has a first port connected on line 306 to a port in element 116 and has a second port connected to line 104. The switch 304 has a control input connected to line 308. The detection sub-system 110 has a second control output connected to 308. Similar to the operation described above for FIG. 1, the detection sub-system 110 second output supplies a second control signal on line 308 in response to comparing voltage levels on line 104 to a second threshold value, and the switch 304 operates in response to accepting the second control signal. In some aspects, in response to detecting a signal voltage level less than the second compatibility threshold value, the detection sub-system 110 second control output supplies a second connection control signal on line 114. Then, the switch 304 closes in response to the second connection control signal. The second compatibility threshold value is typically set equal to, or less than, a maximum voltage level compatible with element 116. The exact value used for the compatibility threshold depends on the parameters for the elements multiplexed on line 104 and the desired function of the system 100 shown in FIG. 3.

Typically, the respective thresholds or voltage ranges for elements 106 and 116 in FIG. 3 are sufficiently different to prevent the use of a single switch to protect both elements. For example, the threshold of destruction for element 106 is included in the normal voltage range for element 116. By using more than one switch, a wider range of element compatibilities can be incorporated into the system 100. For example, assume element 106 has a threshold of destruction of 2V, element 116 operates between 1.8V and 3V and has a threshold of destruction of 3.5V, and element 118 operates between 3V and 5V. Elements 106 and 116 cannot be protected by a single switch since the operating range for element 116 includes the threshold of destruction for element 106. At the same time, element 116 also cannot share an unprotected line with element 118 since the threshold of destruction for element 116 is included in the operating range for element 118. However, given these assumed voltages, the use of switches 108 and 304 permit elements 106, 116, and 118 to be multiplexed on line 104 as shown in FIG. 3, since switches 108 and 304 remain open to protect more sensitive elements when operating voltages on line 104 exceed respective thresholds of destruction or maximum compatible voltages. Switches 108 and 304 are connected in a parallel configuration with respect to line 104. Multiple switches also can be connected in a series configuration (not shown) to provide a similar function.

Figure 4:
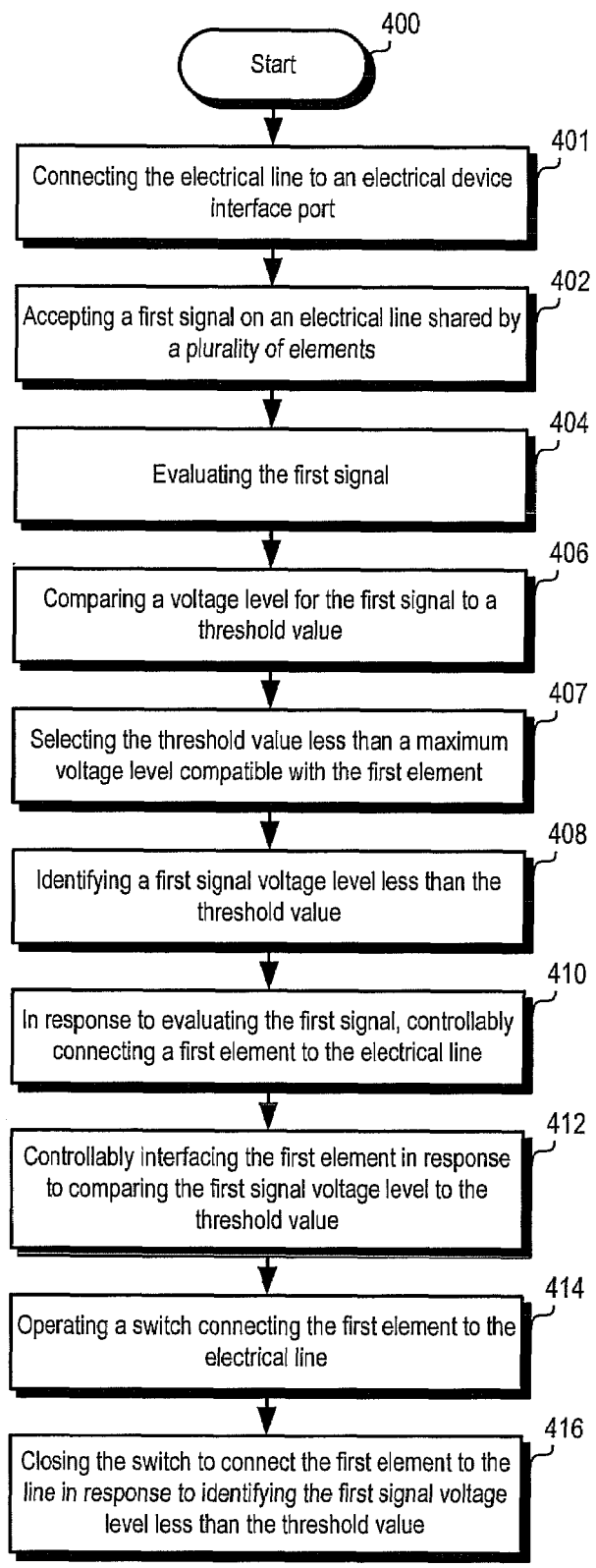
FIG. 4 is a flow chart illustrating a method for protecting multiplexed elements sharing a single electrical line.

FIG. 4 is a flow chart illustrating a method for protecting multiplexed elements sharing a single electrical line. Although the method in FIG. 4 (and FIG. 5 below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts with Step 400. Step 402 accepts a first signal on an electrical line shared by a plurality of elements. Step 404 evaluates the first signal. Step 406 compares a voltage level for the first signal to a threshold value. Step 408 identifies a first signal voltage level less than the threshold value. Step 410 in response to evaluating the first signal, controllably connects a first element to the electrical line. Step 412 controllably interfaces the first element in response to comparing the first signal voltage level to the threshold value. Step 414 operates a switch connecting the first element to the electrical line. Step 416 closes the switch to connect the first element to the line in response to identifying the first signal voltage level less than the threshold value.

In some aspects, a Step 401 connects the electrical line to an electrical device interface port. In some aspects, a Step 407 selects the threshold value less than a maximum voltage level compatible with the first element. In some aspects, controllably interfacing a first element from the electrical line in Step 410 includes connecting the first element to the line. In some aspects, controllably interfacing a first element from the electrical line in Step 410 includes disconnecting the first element from the line.

In some aspects, operating the switch connecting the first element to the electrical line in Step 414 includes operating a transistor connecting the first element to the electrical line. In some aspects, operating a transistor connecting the first element to the electrical line includes operating a transistor selected from the group including field effect transistors (FETs) and bipolar junction transistors (BJTs).

FIG. 5 is a flow chart illustrating a method for protecting multiplexed elements sharing a single electrical line. The method starts with Step 500. Step 502 accepts a signal on a line shared by a first plurality of elements. Step 504 compares a first signal voltage level to a threshold value. Step 506 in response to comparing the first signal voltage level, operates a second plurality of switches connecting a third plurality of respective elements, included in the first plurality of elements, to the electrical line.

A system and a method are provided for protecting multiplexed elements sharing a single electrical line. Examples of the present invention have been enabled with a wireless communications device and an electrical device interface port. However, it should be understood that the present invention is not limited to wireless communications devices or even to portable devices in general and also is not limited to use with interface ports. The present invention system and method are applicable to any device that multiplexes multiple elements on a single electrical line. Portable devices to which the present invention system is applicable also include lap top computers, personal digital assistants, and music players. Other variations and embodiments of the present invention will occur to those skilled in the art.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

We claim:

1. A method for protecting multiplexed elements sharing a single electrical line, the method comprising:
   accepting a first signal on an electrical line shared by a plurality of elements;
   evaluating the first signal by comparing the first signal voltage level to a threshold value; and,
   in response to comparing the first signal voltage level to the threshold value, controllably interfacing a first element with the electrical line by operating a switch connecting the first element to the electrical line.

2. The method of claim 1 further comprising:
   connecting the electrical line to an electrical device interface port.

3. The method of claim 1 wherein controllably interfacing the first element with the electrical line includes connecting the first element to the line.

4. The method of claim 1 wherein controllably interfacing the first element with the electrical line includes disconnecting the first element from the line.

5. The method of claim 1 wherein comparing the voltage level for the first signal to the threshold value includes identifying a first signal voltage level less than the threshold value; and,
   wherein operating the switch connecting the first element to the electrical line includes closing the switch to connect the first element to the line in response to identifying the first signal voltage level less than the threshold value.

6. The method of claim 5 further comprising:
   selecting the threshold value less than a maximum voltage level compatible with the first element.

7. The method of claim 1 wherein operating the switch connecting the first element to the electrical line includes operating a transistor connecting the first element to the electrical line.

8. The method of claim 7 wherein operating the transistor connecting the first element to the electrical line includes operating a transistor selected from the group including field effect transistors (FETs) and bipolar junction transistors (BJTs).

9. A system for protecting multiplexed elements sharing a single electrical line, the system comprising:
   a plurality of elements connected to the electrical line;
   a first element, in the plurality of elements, with a port;
   a switch with a first port connected to the electrical line, a second port connected to the first element port, and a control input to accept control signals, the switch operating in response to accepting the control signals; and, a detection sub-system with an input connected to the electrical line, the detection sub-system input to detect a signal on the electrical line, and a control output connected to the switch control input, the control output to supply the control signals in response to the detection sub-system evaluating a detected signal.

10. The system of claim 9 further comprising:
a device external interface port connected to the electrical line.

11. The system of claim 9 wherein the detection sub-system control output supplies control signals in response to comparing a detected signal voltage level to a compatibility threshold.

12. The system of claim 11 wherein the detection sub-system control output supplies a connection control signal in response to the detection sub-system detecting, for a signal on the electrical line, a voltage level less than the compatibility threshold value; and,
wherein the switch closes in response to accepting the connection control signal.

13. The system of claim 12 wherein the compatibility threshold value is less than a maximum voltage level compatible with the first element.

14. The system of claim 11 wherein the switch is a transistor with a first terminal connected to the first element first port, a second terminal connected to the electrical line, and a third terminal connected to the detection sub-system control output.

15. The system of claim 14 wherein the transistor is selected from the group including field effect transistors (FETs) and bipolar junction transistors (BJTs).

16. The system of claim 11 wherein the detection sub-system is a controller with an input connected to the electrical line and an output connected to the switch control input.

17. The system of claim 15 wherein the first element is an amplifier with an input to accept an audio signal, a control input to accept an enable signal, a control output to supply a V-signal in response to accepting the enable signal, and an output to supply an amplified audio signal;
wherein the switch is an FET with a drain terminal connected to the amplifier output, a source terminal connected to the electrical line, and a gate terminal; and,
wherein the detection sub-system includes:
a first resistor with a first port connected to the electrical line and a second port connected to the FET gate terminal;
a second resistor with a first port connected to ground and a second port;
and,
a BJT with a collector terminal connected to the FET gate terminal, an emitter terminal connected to the amplifier control output, and a base terminal connected to the second resistor second port.

18. In a wireless communications device, a system for protecting multiplexed elements sharing a single electrical line, the system comprising:
a plurality of elements connected to the electrical line
a first element, in the plurality of elements, with a port;
an FET with a source terminal connected to the first element port, a drain terminal connected to the electrical line, and a gate terminal to accept a switch control signal, the FET operating in response to accepting the switch control signal; and,
a detection sub-system with an input connected to the electrical line, the detection sub-system to detect a voltage level for a signal on the electrical line, and a control output connected to the FET gate terminal, the control output to supply the switch control signal in response to the detection sub-system comparing a detected voltage level to a maximum voltage level compatible with the first element.

* * * * *